(12) United States Patent
Cheng

(10) Patent No.: US 6,360,131 B1
(45) Date of Patent: Mar. 19, 2002

(54) MODEL-FREE ADAPTIVE CONTROL FOR FLEXIBLE PRODUCTION SYSTEMS

(75) Inventor: George Shu-Xing Cheng, Folsom, CA (US)

(73) Assignee: Cheng, Rancho Cordova, CA (US)

( * ) Notice: Subject to any disclaimer, the term of this patent is extended or adjusted under 35 U.S.C. 154(b) by 0 days.

(21) Appl. No.: 09/174,156

(22) Filed: Oct. 16, 1998

(51) Int. Cl.[7] ............................................... G05B 13/02
(52) U.S. Cl. ........................... 700/40; 700/28; 700/48; 700/52; 700/55
(58) Field of Search .................. 700/28, 40, 37, 700/41, 39, 42, 43, 47, 48–50, 52, 54, 55, 71, 72, 75–77; 706/900, 23, 902–904, 906

(56) References Cited

U.S. PATENT DOCUMENTS 5,587,896 A * 12/1996 Hansen et al. ................ 700/28
5,748,467 A * 5/1998 Qin et al. ...................... 700/50

* cited by examiner

Primary Examiner—William Grant
Assistant Examiner—Steven R. Garland
(74) Attorney, Agent, or Firm—Stout, Usa, Buyan & Mullins, LLP

(57) ABSTRACT

A flexible multifunction model-free adaptive controller capable of controlling a very broad range of processes uses storage and selective use of multiple controller parameter sets, measurement filtering, transient prediction and use of extra controllers to dynamically set constraints for the output of the process controller in order to deal with transients resulting from sudden input changes, yet allow the process to run close to its physical limitations under dynamically varying operating conditions and periodic large processing parameter changes.

5 Claims, 4 Drawing Sheets

MODEL-FREE ADAPTIVE CONTROL FOR FLEXIBLE PRODUCTION SYSTEMS

FIELD OF THE INVENTION

The invention relates to industrial process control, and more particularly to a method and apparatus for adaptively controlling various continuous and semi-continuous processes so that a flexible production system can be built to achieve Just-in-Time (JIT) manufacturing to improve quality, increase efficiency, reduce waste, and sharpen competitive edge.

BACKGROUND OF THE INVENTION

A new industrial revolution is evolving. Continuous and semi-continuous process industries are under ever increasing pressure to improve efficiency, profitability, and competitive position. The old concept that a continuous process is the most efficient may not be correct any more.

In the continuous process industry (petrochemical, chemical, power and utility, water treatment, etc.), the processes are usually running 24 hours a day year round. A refinery today may be forced to make only certain products at certain times in specific quantities to achieve the highest economic benefits based on market demands and prices. Over producing can cause big burdens in storage, cash flow, and price, etc. A combined cycle power plant used for cogeneration of electric and thermal energy may need to provide a large amount of steam on demand while at the same time maintaining balance in power generation.

In the semi-continuous process industry (iron and steel, pharmaceutical, semiconductor, cement, pulp and paper, tire and rubber, glass and plastic, food and beverage, etc.), producing different products as needed is a more common practice. However, switching batches or recipes usually causes waste in material, time, and resources. The new challenge is how to cut down on scrap, reduce setup time, and facilitate smooth transitions while keeping products within specifications.

In this evolution, Just-in-Time (JIT) manufacturing methodology can be applied to the process industry to meet the new demands. Just-in-Time covers a wide array of business and production objectives. (1) A schedule that satisfies product demand; anything more or less is waste. (2) Quality is measured not in percentage points but as defects in parts per million; 'zero defects' or 'six sigma' is the ultimate goal. (3) Inventory does not stand or sit; it flows.

JIT needs 3 major elements to implement: (1) the people to implement and carry out the objectives of JIT; (2) a physical process with the capability to manufacture "zero defects" parts; and (3) a computer system with the intelligence to plan, schedule, optimize, and control the process and operations.

JIT has been adapted and implemented in the discrete manufacturing industries. For instance, most of the cars produced in Japan and United States today are based on JIT manufacturing. Similar to the discrete industry, JIT in the process industry also relies on a flexible production system that combines the effort of people, process, and system. However, the challenge to implement such a system in the process industry is quite different than in the discrete industry.

In the process industry, it is difficult to change production configurations because of the resulting major disturbances in energy balance and material balance. When a process loses its energy and material balance, the consequences can be significant. It can change the process dynamic behavior so much that the process goes out of automatic control. This can cause severe system safety, productivity, and product quality problems. A process going wild has to be put in manual control by experienced engineers or operators. A large process usually takes a long time to settle down and recover the balance. Therefore, although highly desirable, flexible production systems are not popular in process industries because of these associated problems.

The key to implementing a flexible production system in the process industry is a control technology that can deal with large production configuration changes. Processes with changes in batch, load, configuration, and specification are extremely difficult to control. The processes will typically be nonlinear, multivariable, time-variant, structure-variant, and specification-variant. They usually have small open-loop stable ranges and some of them may have bad transient behavior or even open-loop unstable behavior.

The Model-Free Adaptive (MFA) control methodology described in U.S. Pat. No. 6,055,524 and patent application Ser. No. 09/143,165 filed on Aug. 28, 1998 is able to deal with various complex processes in practice. However, it may have difficulty in effectively controlling the following processes:

a) a process whose dynamic behavior changes so much that the MFA control system is out of its operating range; and b) a process that has bad transient behavior when the process input has a sudden change.

In addition, the Model-Free Adaptive control methodology described in the above-identified patent applications did not address the question of how to deal with certain controller constraints which are important for controlling various continuous or semi-continuous complex processes.

SUMMARY OF THE INVENTION

The present invention overcomes the above-identified limitations of the prior art by using a multifunction MFA controller, in which those controller parameters that govern the operations of the controller at various times are stored in a multifunction advisor, and are selectively applied to the controller as needed from time to time. A measurement filter may be used to cope with special conditions arising during parameter changes. The flexibility and adaptive capability of the inventive MFA controller allows it to control a very broad range of processes. A model-free adaptive transient control system is disclosed to deal with processes that have bad transient behavior due to sudden input changes. This system operates by modifying the process output signal component of the controller's error input upon the occurrence of a transient-generating condition to prevent the transient from affecting the controller. An MFA controller constraint handling method is introduced which allows the user to configure MFA controller constraints easily by maintaining the controller output within dynamically varying ranges. When a control system is bounded by certain constraints, the operator can run the system much more freely because the system will not go beyond the constraints. Higher efficiency and throughput call thereby be achieved while the plant safety is also protected.

DESCRIPTION OF THE PREFERRED EMBODIMENTS

A. Multifunction Model-Free Adaptive Control

A process that needs to be switched back and forth in different operating conditions often has a nonlinear behavior between its input and output. A batch switch can change the production speed, material throughput, energy consumption rate and direction, and product specification.

Production speed changes usually result in a change in process delay times. A process delay time is usually the time that a part takes to travel from point A to point B, where control action is taken at point A and measurement is made at point B. If the production speed is slowed down by half, the delay time will be doubled.

Material throughput changes can cause large disturbances in process operating conditions, which can move the process to a new operating point. The dynamic behavior of a nonlinear process can vary significantly in different operating conditions.

Energy consumption rate and direction changes can cause the process to change its dynamic behavior. The process steady-state gain and time constant can be greatly affected. For instance, if switching a process from batch 1 to batch 2 requires adding heat into the process, the time constant can be quite small since it is usually easy to add heat. But when switching the same process from batch 2 to batch 1 requires taking heat out of the process, it may take a much longer time for the process to reach the new operating point, especially if the system does not have a way to quickly remove the heat. This means that the same process has a much bigger time constant when switching from batch 2 back to batch 1.

Product specification changes do not change the process dynamic behavior but can make the system more complicated to control and maintain. If batch 1 produces a large size product and batch 2 produces a small size product, the plus and minus differences in specification dimensions will affect control performance expectations.

A process that needs to be switched to different operating conditions is difficult to deal with due to the possible problems mentioned above. Obviously, a traditional controller such as PID is not sufficient. Even a model-free adaptive controller, which can be positioned to a nominal operating point to cover a broad operating range, can still have the following problems: (1) the operating range is not large enough; and (2) when the same controller tries to control a process with wide behavioral and operating condition changes, control performance will be sacrificed.

To solve these problems, a multifunction MFA control system is introduced. The inventive multifunction MFA controller, which preferably takes the form of a computer program.

Figure 1:
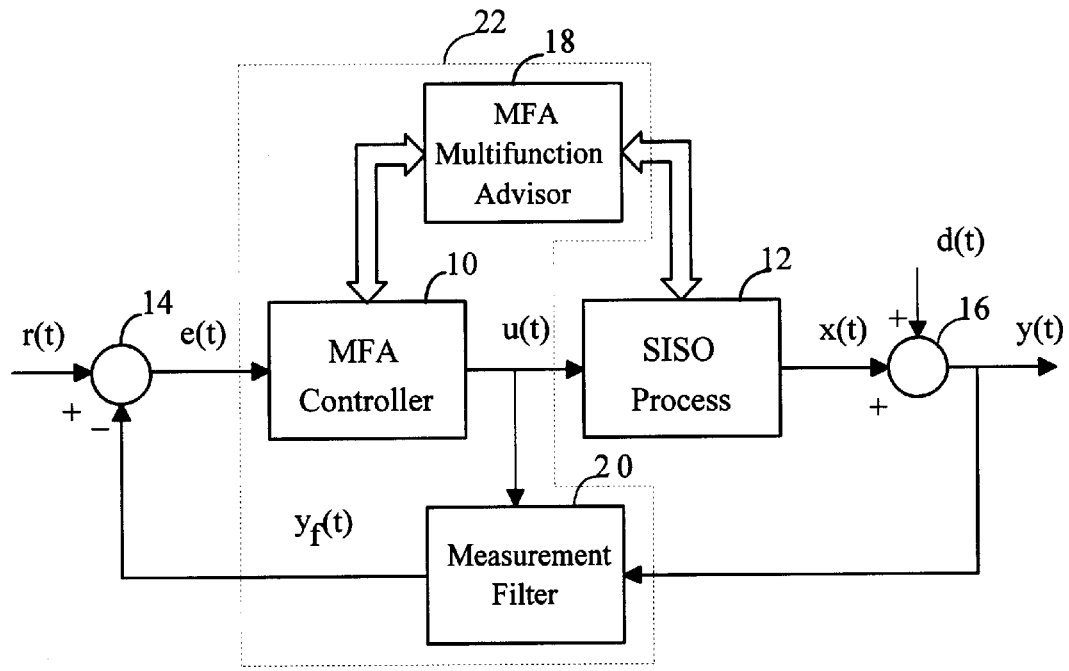
FIG. 1. is a block diagram illustrating a single-variable multifunction model-free adaptive control system according to this invention.

FIG. 1 illustrates a single variable multifunction model-free adaptive control system. It includes a single-input-single-output (SISO) process 12, signal adders 14 and 16, and an MFA multifunction controller 22 that consists of an MFA controller 10, an MFA multifunction advisor 18, and a measurement filter 20. To simplify the description, the MFA controller is assumed to include the anti-delay function also. The related signals and functions of elements 10, 12, 14, and 16 have been described in the patent applications, Ser. Nos. 08/944,450 and 09/143,165, which are herein incorporated by reference.

As disclosed in more detail in the above patent applications, the MFA controller 10 consists of a learning neural network with a multi-node input layer to which time-delayed functions of an error signal e(t) are applied, a multi-neuron hidden layer which sums the outputs of the input layer nodes individually weighted by weighting factors $w_{ij}(n)$, and a single-neuron output layer which sums functions of the outputs of the hidden layer neurons individually weighted by weighting factors $h_j(n)$. The output u(t) of the neural network is a function of the output of the output layer neuron.

To show how the MFA multifunction advisor 18 and the measurement filter 20 work, we need to abstract the representation of the MFA controller 10 by defining its output as a function of several variables, thus:

$$u(t)=f(K_c, T_c, \tau, K_s, N, e(t)), \quad (1)$$

where u(t) is the controller output, $K_c$ is the controller gain, $T_c$ is the estimated process time constant, $\tau$ is the estimated process delay time, $K_s$ is the controller sign factor, N is the number of the input layer nodes and hidden layer neurons, and e(t) is the controller input. These are the variables that will affect the controller behavior and control output. They will be referred to herein as controller parameters.

Equation (1) is obtained by using Equations (1) to (14) of the patent application Ser. No. 09/143,165. Although weighting factors $w_{ij}(n)$ and $h_j(n)$ of the MFA controller 10 are important to the controller's adaptive capabilities, they are not included in Equation (1) since they will always be automatically updated by the learning algorithms. Therefore, weighting factors are not considered as controller parameters.

The MFA multifunction advisor 18 is designed to (1) save the estimated or designed settings for the controller parameters for each batch, (2) save the formulas to calculate the parameters if they are available; and (3) download proper parameter settings based on the batch changes. The methods used to estimate or calculate the parameters of the MFA controller 10 are introduced in the following.

1. Adjustment of Controller Gain

The MFA controller gain $K_c$ is set based on the estimated process static gain K as follows:

$$K_c 1 = 1/K, \quad (2)$$

where K is defined as the gain between the change of steady-state process output over the steady-state process input following a step change in the input. In real applications, K is also related to the scaling of process input and output, which can be found as follows:

$$K = \frac{\Delta y\%}{\Delta u\%} \quad (3)$$

$$= \frac{\frac{\Delta y}{UL_y - LL_y}}{\frac{\Delta u}{UL_u - LL_u}}$$

where $UL_y - LL_y$ is the range of process output y(t) and $UL_u - LL_u$ is the range of process input u(t). The process static gain can vary significantly after batch switches or process changes, especially for nonlinear processes.

2. Adjustment of Time Constant

The process time constant $T_c$ can vary widely with batch changes. If a process in a batch has a unique time constant, the MFA multifunction advisor can save the estimated time constant for each batch and download the value to the MFA controller during the batch change.

If a process in a batch has two or more very different time constants due to the batch direction changes, it is desirable to design the MFA multifunction advisor to save two or more time constants for each batch. Then a counter that reflects the batch status and direction changes can be used to trigger the download of the new time constant as follows:

$$T_c = T_c, \text{ If counter}=0 \tag{4a}$$

$$T_c = T_{c1}, \text{ If counter}=1 \tag{4b}$$

$$T_c = T_{c2}, \text{ If counter}=2 \tag{4c}$$

...

$$T_c = T_{cn}, \text{ If counter}=n \tag{4d}$$

where n=1, 2, ... N. $T_{c1}$, $T_{c2}$, and $T_{cn}$ are all distinctive time constants. When counter=0, the time constant does not need to be reset even when there is a batch change. When the counter is at a non-zero count m, $T_{cm}$ is used.

Although the time constant can vary widely in different batch direction combinations, it is not necessary to save them all since the model-free adaptive controller is able to deal with a large range of time constant changes.

3. Adjustment of Delay Time

The process delay timer can be estimated by using the following formula:

$$\tau = L/v, \tag{5}$$

where L is the distance that the part travels from point A to point B, and v is the traveling speed, which is usually the production speed. The control action is taken at point A and measurement is made at point B.

4. Adjustment of Controller Sign Factor

The MFA multifunction advisor keeps checking the acting behavior of the process. Direct-acting means that an increase in the process input will cause its output to increase, and vice versa. Reverse-acting means that an increase in the process input will cause its output to decrease, and vice versa. When the MFA Advisor finds that the acting type has changed, it can reset the acting type configuration in the MFA controller.

5. Adjustment of Neural Network Structure

The neural network used in the MFA controller has a structure of N-N-1 in the input-hidden-output layer. Experiments have shown that the MFA controller behavior is related to the selection of N. The following rule of thumb can be used for changing the structure of the neural network:

$$N=15, \text{ if } k=1 \tag{6a}$$

$$N=10, \text{ if } 1<k<5 \tag{6b}$$

$$N=5, \text{ if } k>5 \tag{6c}$$

where k is the order of the process dynamic equation.

The multifunction MFA controller thus becomes a structure variant MFA controller in addition to its adaptive capability and flexibility in parameter settings. The controller is able to deal with a broad range of processes that have distinctive dynamic behavior.

6. Adjustment of Error e(t)

When a process has a sudden change, the signal of the measured variable may have some spikes due to its process nature or the sensor distortion. For instance, when a process has a major product size change, the sensor measuring the area that has the sudden change may generate some faulty data. The spikes and faulty data can confuse the controller and cause it to produce an improper control action.

The measurement filter 20 is used to screen out faulty or unwanted data of y(t) so that the input to the controller will allow the controller to "feel" that it is doing the right job. Specifically, filter 20 continuously examines the controller output and process output data and does one of the following things based on user's preference:

a) If the measured process output exceeds predetermined measurement limits for given a controller output, use the data that are bounded by the limits;

b) If the measured process output so exceeds the measurement limits, assume that the data that exceed the limits are bad and use the data previously saved;

c) For a process with a lot of measurement noises, the filter 20 can smooth the data by using an average or weighted average formula.

d) For a process whose output has bad transient behavior due to a sudden input change, the MFA transient controller to be described in Section B can be used.

Figure 2:
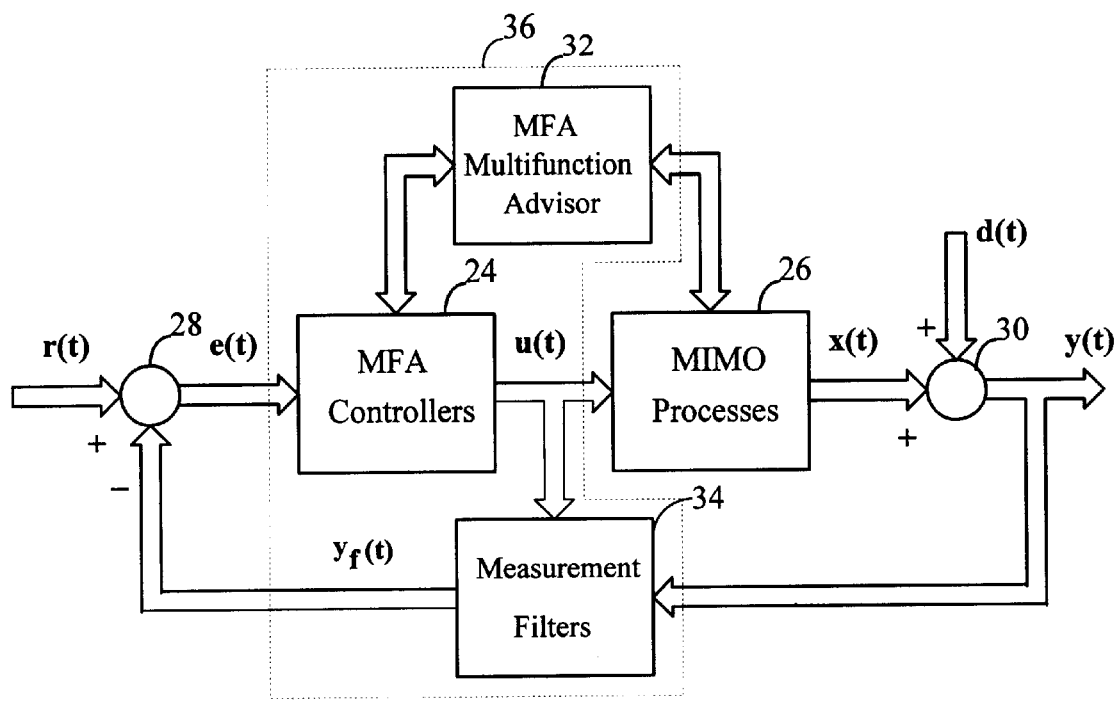
FIG. 2. is a block diagram illustrating a multivariable multifunction model-free adaptive control system according to this invention.

FIG. 2 illustrates a multivariable multifunction model-free adaptive control system. It includes a multi-input-multi-output (MIMO) process 26, signal adders 28 and 30, and a set of multivariable multifunction MFA controllers 36 that consist of a set of multivariable MFA controllers 24, a set of MFA multifunction advisors 39, and a set of measurement filters 34. The MFA controllers are assumed to include the anti-delay function also. The related signals and functions of elements 24, 26, 28, and 30 have been described in the patent applications Ser. No. 08/944,450 filed on Oct. 6, 1997 and Ser. No. 09/143,165 filed on Aug. 28, 1998.

For a M×M multivariable MFA controller, the output for each main controller can be represented by the following equation:

$$u_l(t) = f(e_l(t), K_c^{ll}, T_c^l, \tau^l, K_s^l, N, K_c^{lm}), \tag{7}$$

where l=1,2, ... M; m=1,2, ... M; and l≠m.

The functions of the MFA multifunction advisor are the same as in the single variable case. The extra parameters for a multivariable MFA controller include the compensator gain or predictor gain $K_c^{lm}$ as well as the corresponding sign factor $K_s^{lm}$. They may need to be reset accordingly if the interactions between the loops change during a batch switch. The MFA multifunction advisor can save and reset these parameters during the batch switch.

For instance, if a process batch switch affects the interactions in the sub-processes, the compensator gain or predictor gain needs to be adjusted accordingly.

B. Model-Free Adaptive Transient Controller

In a flexible production system, a process may have a bad transient behavior (BTB) due to sudden input changes. A bad transient behavior of a process output can be described as a nonlinear, oscillating, or spiking response to a step change in input. A process that deals with compressible materials may have this behavior. No matter what control action is taken, the process output will have oscillation effects for a period of time before it settles down. If a regular feedback controller is used, the oscillation in the measured variable that occurs during the transient period can confuse the controller. Improper control actions are generated resulting in poor control performance.

Figure 3:
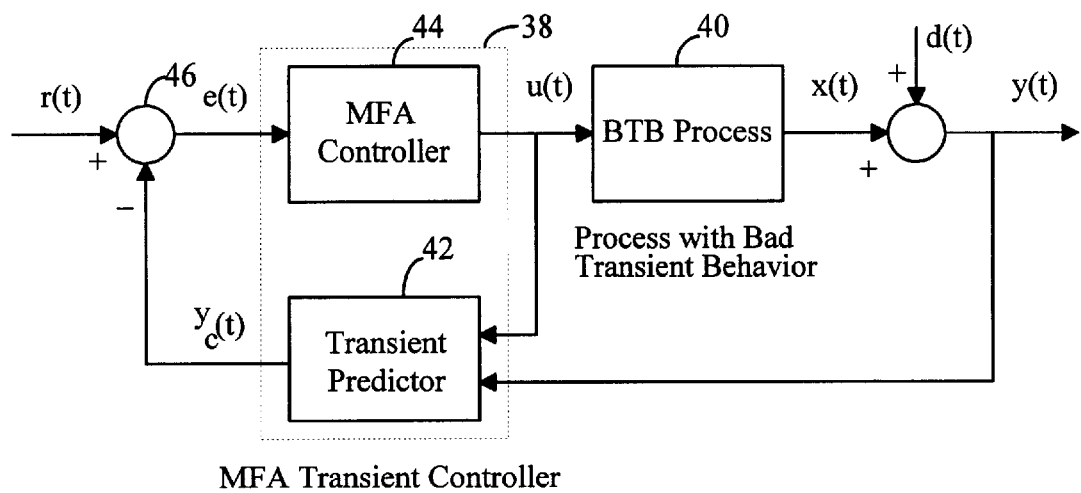
FIG. 3. is a block diagram illustrating a single-variable model-free adaptive transient control system according to this invention.

FIG. 3 shows a block diagram for a single-input-single-output model-free adaptive transient control system with an MFA transient controller 38 and a process with bad transient behavior (BTB) 40. The MFA transient controller 38 consists of a regular MFA controller 44 and a special transient predictor 42. The predictor produces a dynamic signal $y_c(t)$ to replace the measured variable y(t) as the feedback signal. Then, the input to controller 44 is calculated through adder 46 as $$e(t)=r(t)-y_c(t), \qquad (8)$$

where $y_c(t)$ is the predictor output.

The predictor continuously checks the controller output. If the output has only slow and smooth changes, it remains in the Pass Mode to allow $$y_c(t)=y(t). \qquad (9)$$

When the predictor finds that the controller output has a sudden change, it will switch to the Transient Mode to take the following actions:

(a) discard the data received during the transient period $T_x$ and use the last sampled data of y(n) read before the sudden change; The transient period can be easily estimated from a process trend chart;

(b) produce a predictive signal to prevent the controller from "sensing" the bad transient signals;

(c) produce a predictive signal that allows the controller to "feel" a good response signal during the transient period; and (d) go back to "Pass Mode" after the transient period $T_x$.

In order to provide a good response signal to the controller, the predictor can be designed based on the following Laplace transfer function:

$$Y_c(S) = Y(S) + \frac{(1-e^{-T_x S})}{K_c(T_c S + 1)} U(S), \qquad (10)$$

where Y(S), U(S), and $Y_c(S)$ are the Laplace transform of signals y(t), u(t) and $y_c(t)$, respectively; $K_c$ is the controller gain of the MFA controller 44, $T_c$ is the estimated process time constant, and $T_x$ is the estimated transient period.

Figure 4:
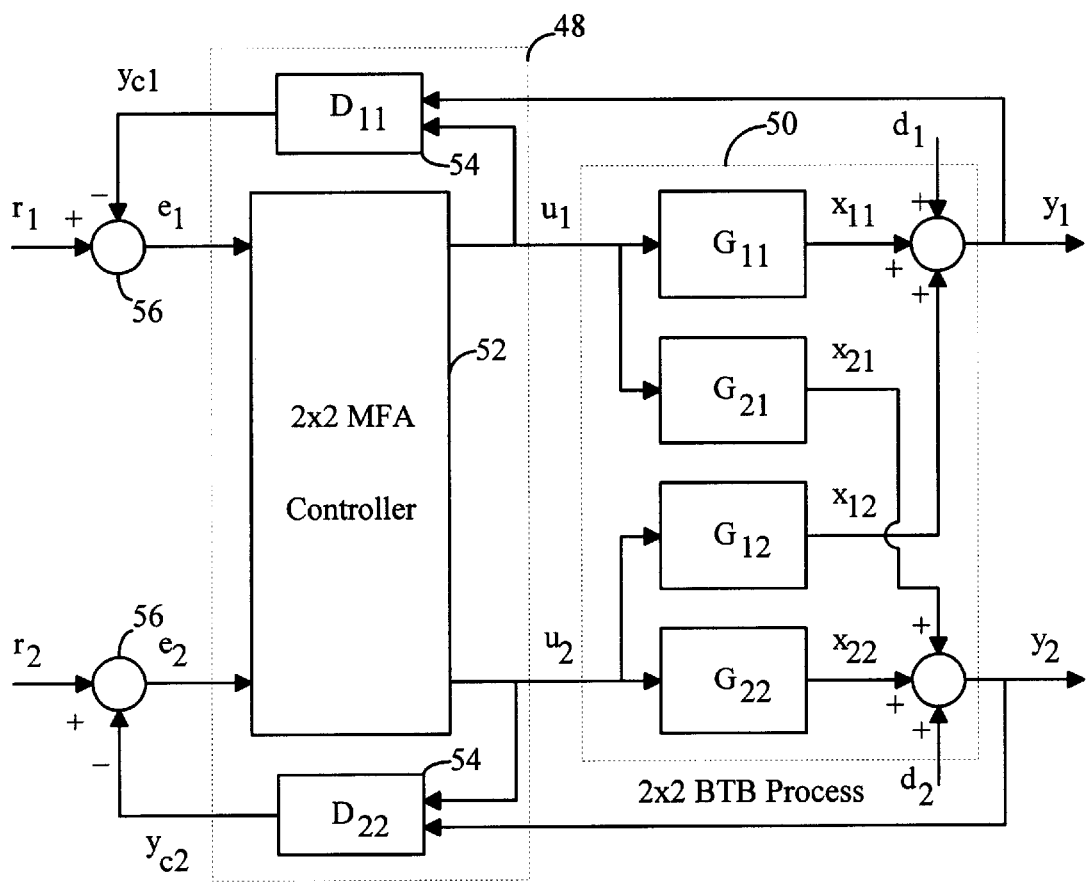
FIG. 4. is a block diagram illustrating a 2×2 model-free adaptive transient control system according to this invention.

FIG. 4 illustrates a 2×2 multivariable model-free adaptive transient control system. The MFA transient controller set 48 includes a 2×2 MFA controller 52 and two transient predictors $D_{11}$ and $D_{22}$ 54. The process 50 has bad transient behavior. The inputs to the controllers are calculated at adders 56 by $$e_1(t)=r_1(t)-y_{c1}(t), \qquad (11a)$$

$$e_2(t)=r_2(t)-y_{c2}(t), \qquad (11b)$$

where $y_{c1}(t)$ and $y_{c2}(t)$ are the outputs of transient predictors $D_{11}$ and $D_{22}$, respectively.

The above-stated methodology of the MFA transient controller can be readily used in multivariable cases. Equations (9) and (10) can be applied to design the predictors in the Pass Mode and Transient Mode. Without losing generality, a higher order multivariable MFA anti-transient control system can be designed accordingly.

C. Constraints Handling

Process plant operators are often conservative in running control systems. For instance, (1) controllers are de-tuned causing insufficient control action and slow process responses; and (2) controller setpoints are not set close enough to their desired positions to improve economic benefits. Operators are often afraid to run the system anywhere near its physical limitations since safety is always the number one priority. It is acceptable to run the process in this way even though the tradeoff can result in significant loss of productivity and efficiency.

If the control limits are the hard boundaries for controller output, the control constraints are the soft boundaries for controller output. In complex control applications, the control limits are usually not sufficient to deal with the problems. A too conservative setting of control limits will cause the controller to reach the limits too easily resulting in poor control performance. A too aggressive setting can cause the control system to run into dangerous conditions.

Controller constraints dynamically set "intelligent" boundaries for the controller output under complex situations so as to allow the system to run close to its physical limitations. Better control performance and efficiency can be achieved without the risk of running the system into dangerous conditions.

One of the advantages of model predictive control (MPC) is that it can calculate controller constraints based on the predictive model and current system information. However, model predictive control is difficult to implement.

Since model-free adaptive control is mainly used to deal with multivariable, nonlinear, time-variant, and structure-variant processes for large processes, setting proper constraints is very important. A general purpose constraint handling method for a model-free adaptive control system is introduced in the following. Without requiring high level expertise to design the controller and constraints, users can add constraints to its model-free adaptive controllers quite easily based on some qualitative information of the process.

1. Single Constraint on Single Controller Output

Figure 5:
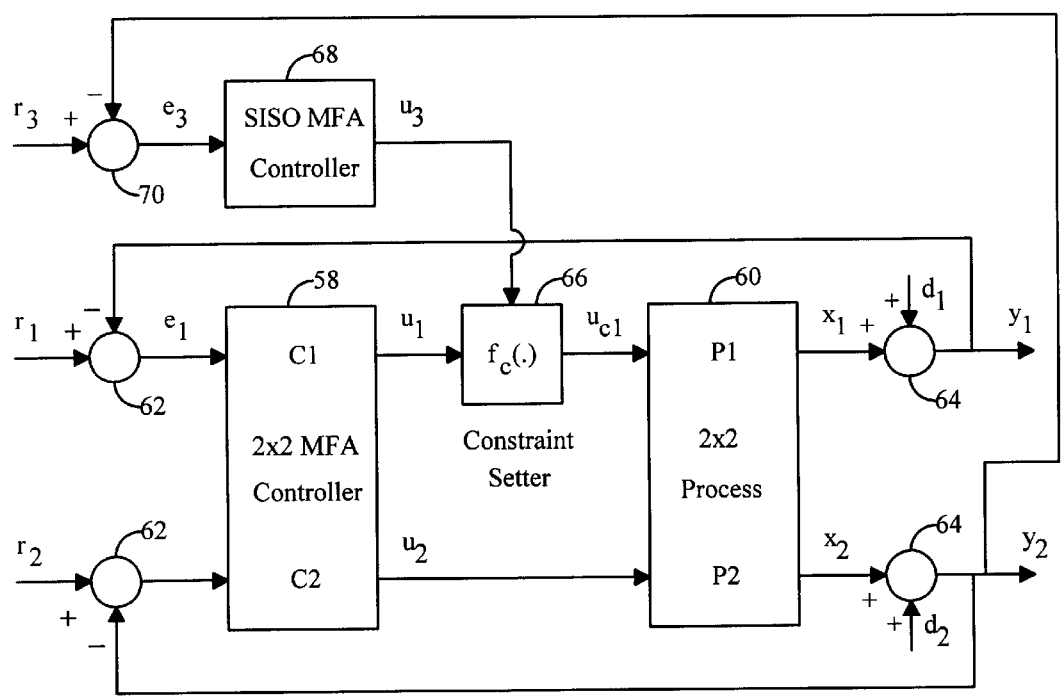
FIG. 5. is a block diagram illustrating a 2×2 MFA control system with a constraint controller that provides a lower bound for a controller output according to this invention.

To show how this method works, we begin by studying a special case. FIG. 5 illustrates a 2×2 MFA control system which includes a 2×2 MFA controller 58, a 2×2 process 60, and signal adders 62 and 64. We assume (1) the process variable $y_2$ needs protection; (2) both manipulated variables $u_1$ and $u_2$ affect $y_2$; (3) $u_2$ is used as the manipulated variable to regulate $Y_2$ in the main loop 2; and (4) $u_1$ is allowed to be bounded by a constraint.

A regular SISO MFA controller 68 is used in the system to provide an "intelligent" boundary for $u_1$. The constraint setter 66 forces $u_1$ to be bounded by $u_3$ under certain conditions.

If $u_1$ requires a lower bound, we can set $$r_3(t)=r_2(t)-B, \qquad (12)$$

where $r_3(t)$ is the setpoint for controller 68, $r_2(t)$ is the setpoint for $u_2(t)$, and B>0 is the activation threshold that can be set arbitrarily. For instance, B can be set to 10% of the full scale of $y_2(t)$. That is, if $y_2(t)$ has a full scale of 0 to 100, set B=10. The input to controller 68 is an error signal calculated by $$e_3(t) = r_3(t) - y_2(t) \qquad (13)$$
$$= r_2(t) - y_2(t) - B$$
$$= e_2(t) - B,$$

The constraint setter is actually a limit function $f_c(\cdot)$ that sets the low bound for $u_1$.

$$u_{c1}(t)=u_1(t), \text{ if } u_1(t) \geq u_3(t) \qquad (14a)$$

$$u_{c1}(t)=u_3(t), \text{ if } u_1(t)<u_3(t) \qquad (14b)$$

where $u_{c1}(t)$ is the output signal of limit function $f_c(.)$ and is used as the actual control signal to the process.

In the normal situation, $y_2$ tracks $r_2$ so that $e_2$ is a very small number and $e_3$ is a negative number based on Equation (12). Since $e_3$ will continue to be a negative number, the controller output $u_3$ will keep going down and sit eventually at its lower limit. In this case, $u_1$ is bigger than $u_3$ so that it is not bounded and can move freely.

In a situation where $y_2$ becomes quite small, $e_2$ is a large positive number causing $e_3$ to be positive. It will make the controller 68 produce an output $u_3$ that is bigger than $u_1$. Then output $u_1$ will be bounded by $u_3$ so that it cannot go any lower and make things worse. That is, $y_2$ will not get smaller because of the control actions from $u_1$. Then $y_2$ will have enough time to recover to its normal value set by $r_2$ based on the control action of $u_2$.

If $u_1$ requires a upper bound, we let $$r_3(t)=r_2(t)+B, \quad (15)$$

where B>0 is the activation threshold that can be set arbitrarily. The controller input is calculated by $$e_3(t)=e_2(t)+B. \quad (16)$$

The function $f_c(.)$ of the constraint setter sets the high bound for $u_1$.

$$u_{c1}(t)=u_1(t), \text{ if } u_1(t) \leq u_3(t) \quad (17a)$$

$$u_{c1}(t)=u_3(t), \text{ if } u_1(t) > u_3(t) \quad (17b)$$

where $u_{c1}(t)$ is the output signal of limit function $f_c(\cdot)$ and is used as the actual control signal to the process.

2. Multiple Constraints on Single Controller Output

Figure 6:
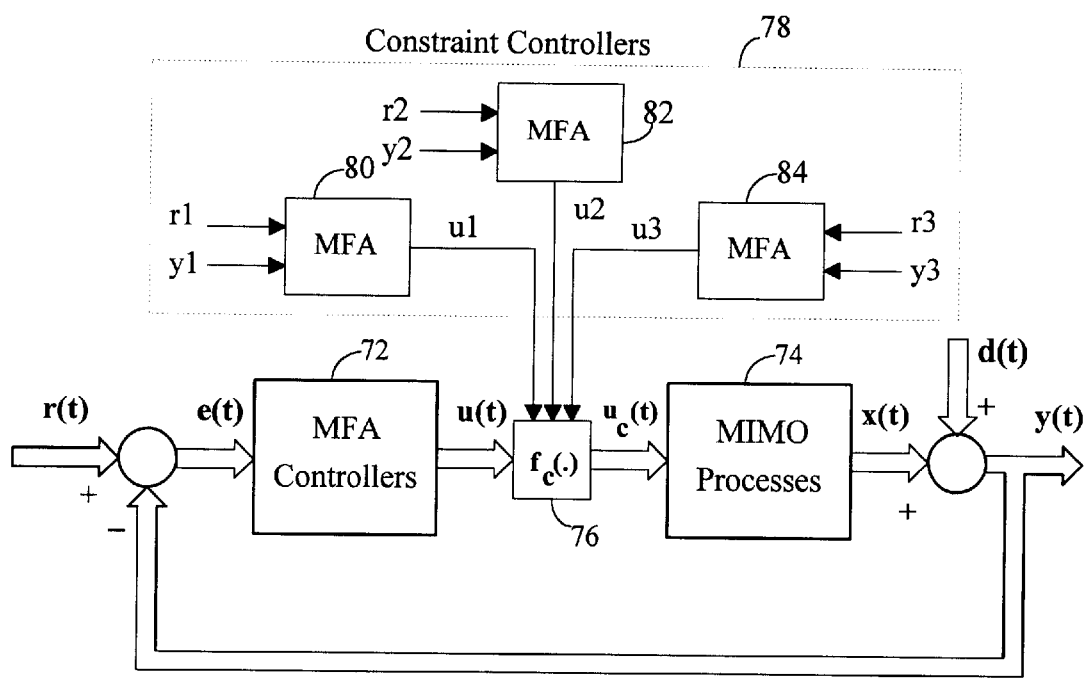
FIG. 6. is a block diagram illustrating a multivariable control system with multiple constraints according to this invention.

Without losing generality, FIG. 6 illustrates a multivariable MFA control system with multiple constraints which includes a multivariable MFA controller 72, a MIMO process 74, a multivariable constraint setter 76, and constraint controllers 78. The control outputs u(t) are bounded by the constraints set by three constraint controllers. The actual control outputs $y_c(t)$ are bounded by the constraint signals of $u_1$, $u_2$, and $u_3$ through the constraint setter. It could be a case when a single control output is bounded by 3 constraints or a case when each of the 3 control outputs is bounded by a constraint, individually. The design aspects and conditions are the same as described in the single constraint case.

I claim:

1. A control system for a process having a control signal input and a measured output, and having a substantially different controller parameters at different times in its operation, comprising:
   a) a model-free adaptive controller having an error signal input representative of the difference between a signal representing the output of said process and a predetermined setpoint, and having as its output a control signal which is a function of a predetermined set of controller parameters associated with said process at a given time in its operation; and
   b) a multifunction advisor arranged to store a plurality of sets of controller parameters associated with different times in the operation of said process;
   a) said multifunction advisor being so connected to said process and said controller as to change said predetermined set of controller parameters in said controller in response to operational changes in said process;
   d) said controller being essentially a neural network; and
   e) said parameters including controller gain, process time constant, process delay time, controller sign factor and neural network architecture.

2. A control system for a process having a control signal input and a measured output, and having a substantially different controller parameters at different times in its operation, comprising:
   a) a model-free adaptive controller having an error signal input representative of the difference between a signal representing the output of said process and a predetermined setpoint, and having as its output a control signal which is a function of a predetermined set of controller parameters associated with said process at a given time in its operation;
   b) a multifunction advisor arranged to store a plurality of sets of controller parameters associated with different times in the operation of said process;
   c) said multifunction advisor being so connected to said process and said controller as to change said predetermined set of controller parameters in sad controller in response to operational changes in said process;
   d) a measurement filter connected to modify said process output representing signal whenever said process output representing signal has predetermined characteristics adversely affecting, the operation of said controller;
   e) said measurement filter being also connected to said control signal and being arranged to modify said process output representing signal whenever said control signal and said process output representing signal have predetermined relationships.

3. A control system for a plurality of interrelated processes having process outputs which are controlled by control signals applied to an input of said processes, said control signals comprising:
   a) a plurality of controllers each having an error input representative of the difference between a predetermined setpoint and a corresponding process output, said controllers being arranged to produced said control signals and to continuously update said control signal as a function of sets of controller parameters to so control said processes as to minimize said error input; and
   b) a single multifunction advisor shared by said controllers and arranged to store a plurality of sets of controller parameters associated with different times in the operation of said processes;
   c) said multifunction advisor being so connected to said processes and said controllers as to change said predetermined sets of controller parameters in said controllers in response to operational changes in said processes.

4. The system of claim 3, further comprising a set of measurement filters connected to modify the outputs of the said processes whenever said process output representing signals have predetermined characteristics adversely affecting the operation of said controllers.

5. The system of claim 3, wherein said controllers are MFA controllers.

* * * * *